(12) United States Patent  (10) Patent No.: US 7,776,241 B2
Hansen et al.                (45) Date of Patent:    Aug. 17, 2010

(54) METHOD AND APPARATUS FOR PRODUCING MICRO PARTICLES

(75) Inventors: Ove Emil Hansen, Søborg (DK); Trevor Gordon Page, Southampton (GB)

(73) Assignee: NIRO A/S, Soberg (DE)

( * ) Notice: Subject to any disclaimer, the term of this patent is extended or adjusted under 35 U.S.C. 154(b) by 891 days.

(21) Appl. No.: 10/584,070

(22) PCT Filed: Sep. 16, 2004

(86) PCT No.: PCT/DK2004/000617

§ 371 (c)(1),
(2), (4) Date: Jan. 9, 2007

(87) PCT Pub. No.: WO2005/061089

PCT Pub. Date: Jul. 7, 2005

(65) Prior Publication Data

US 2007/0152361 A1    Jul. 5, 2007

(30) Foreign Application Priority Data

Dec. 23, 2003  (DK) ................ 2003 01943

(51) Int. Cl.
    B29B 9/00    (2006.01)
(52) U.S. Cl. .................. 264/9; 264/14; 425/6; 425/10
(58) Field of Classification Search .................. None
    See application file for complete search history.

(56) References Cited

U.S. PATENT DOCUMENTS

| | | | |
|---|---|---|---|
| 3,805,869 A | 4/1974 | Winter et al. | |
| 3,933,955 A | 1/1976 | Lysher | |
| 4,465,234 A | 8/1984 | Maehara et al. | |
| 4,490,403 A | 12/1984 | Krag et al. | |
| 4,801,411 A * | 1/1989 | Wellinghoff et al. | 264/7 |
| 4,871,489 A | 10/1989 | Ketcham | |
| 4,909,731 A | 3/1990 | Zinn et al. | |
| 5,085,847 A | 2/1992 | Kurtz et al. | |
| 5,269,980 A * | 12/1993 | Levendis et al. | 264/9 |
| 6,338,809 B1 * | 1/2002 | Hampden-Smith et al. | 264/7 |

FOREIGN PATENT DOCUMENTS

DE    33 18 652 A    11/1984

(Continued)

OTHER PUBLICATIONS

Berkland C. et al., "Fabrication of PLG microspheres with precisely controlled and monodisperse size distributions" (2001), pp. 59-74, Journal of Controlled Release 73, Elsevier Science B.V., Urbana, IL.

(Continued)

*Primary Examiner*—Mary Lynn F Theisen
(74) *Attorney, Agent, or Firm*—Sughrue Mion, PLLC

(57) ABSTRACT

The invention relates to a method and apparatus for producing substantially monodisperse micro particles mainly of heat sensible material using a carrier gas and a drying gas. Relatively dense micro particles with diameters in the range 1-120 μm with a very narrow span can be obtained.

49 Claims, 3 Drawing Sheets

FOREIGN PATENT DOCUMENTS

| | | |
|---|---|---|
| GB | 2 088 274 A | 6/1982 |
| JP | 56 026 501 A | 3/1981 |
| WO | 90/01997 A1 | 3/1990 |
| WO | 93/24237 A1 | 12/1993 |
| WO | 97/34652 A1 | 9/1997 |
| WO | 00/19982 A1 | 4/2000 |
| WO | 00/48774 A1 | 8/2000 |
| WO | 00/5176 A1 | 9/2000 |

OTHER PUBLICATIONS

Schmitt, F. G. et al., "The Confined Double Annular Jet Application Challenge" Jan. 2002, pp. 35-38, Network Newsletter, vol. 1, No. 3, Vrije Universiteit Brussels, Belgium.

Radulescu D. et al., "Uniform Paclitaxel-Loaded Biogradable Microsphere Manufactured by Ink-Jet Technology" Mar. 2003, pp. 1-5, University of Texas, Dallas, TX.

* cited by examiner

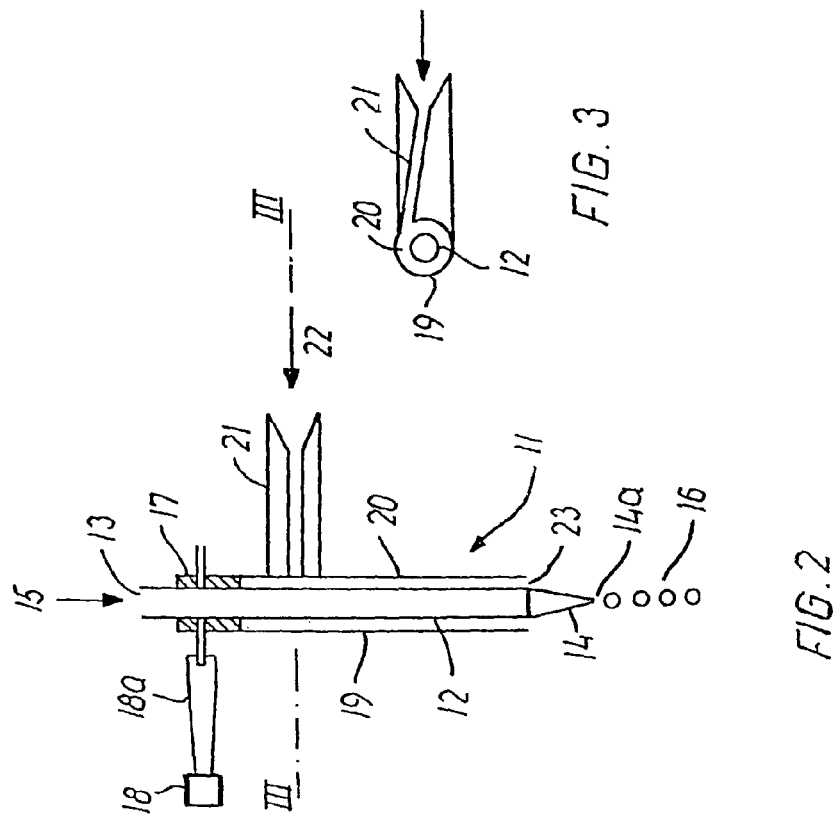
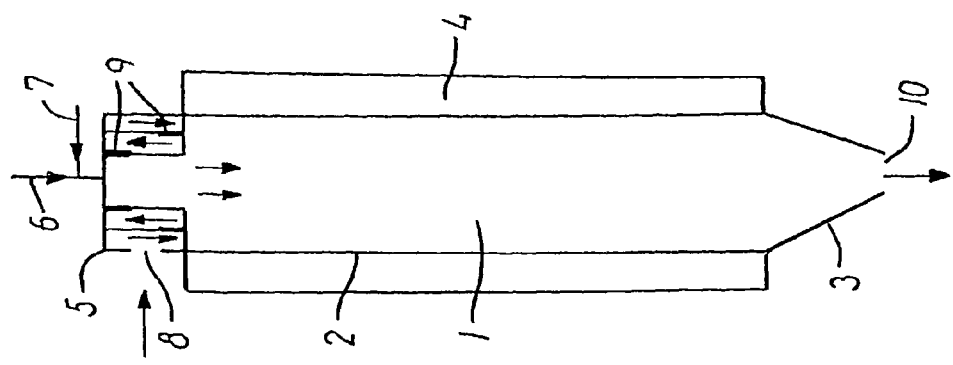

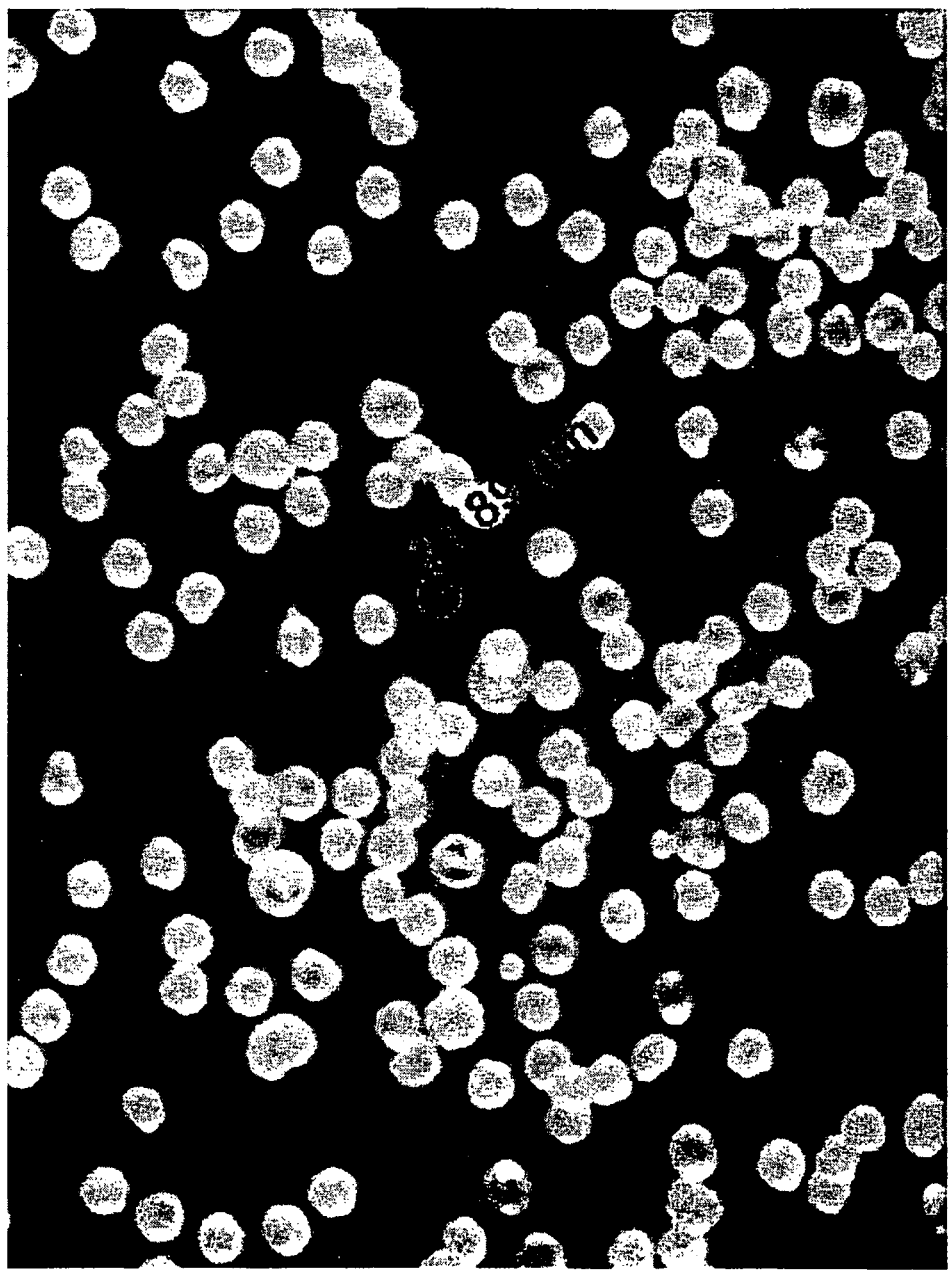
FIG. 6  Uniform trehalose-OVA-β-galactosidase particles in reflected light viewing.

METHOD AND APPARATUS FOR PRODUCING MICRO PARTICLES

This is a National Stage entry of International Application PCT/DK2004/000617, with an international filing date of Sep. 16, 2004, which was published as WO 2005/061089 A1, and from which the benefit of priority was claimed from Danish patent application No. PA 2003 01943 filed Dec. 23, 2003, and the complete disclosure of which is incorporated into this application by reference.

BACKGROUND OF THE INVENTION

The invention relates to a method and apparatus for producing substantially monodisperse micro particles, preferably of a heat sensible material or biological active material. U.S. Pat. No. 4,871,489 A discloses an apparatus and process for producing liquid droplets and solid particles having a narrow size distribution. Thin liquid streams are forced under pressure through a plurality of orifices in an orifice plate, the largest of the orifices having a diameter not greater than about three times the diameter of the smallest of the orifices. The thin liquid streams are oscillated to cause breakup of each stream into droplets having a narrow size distribution. These droplets are subsequently dried to become solid particles having a narrow size distribution. The apparatus and process according to U.S. Pat. No. 4,871,489 is mainly suitable for manufacturing powders of metal oxides. Although powders of metal oxide with excellent characteristics may be produced, the apparatus and process is, however, not suitable for producing powders of heat-sensible material, like e.g. pharmaceutical product. This is due to the fact that exact control of the temperature is difficult in the apparatus and process according to U.S. Pat. No. 4,871,489. Moreover, the disclosed apparatus is constructed in such a way that an efficient cleaning is almost impossible. This, of course, has less significance when dealing with metal oxide powders. However, when dealing with pharmaceutical product, which often has to be handled in sterile environment, it is a major disadvantage. Further, though claiming a narrow size distribution, the results show substantial variation. The description of the method and the examples admit that the method results in droplet impingement. It can be calculated that the velocity of the dispersion gas through the dispersion orifice is in the order of 100 m/s.

SUMMARY OF THE INVENTION

The object of the present invention is to provide a method and an apparatus for by spray drying technique to produce micro-particles of increased uniformity and of increased density in relation to traditionally spray dried particles, and preferably particles of heat-sensible material, in particular micro particles of heat-sensible pharmaceutical materials. The increased uniformity means that the particles are substantially monodisperse, i.e. with a very narrow span.

With a view to this the present invention relates in a first aspect to a method for producing micro particles, preferably of a heat sensible material, which method comprises at least the steps of:

- feeding a feed material to an orifice, said feed material comprising a solution or dispersion or suspension,
- ejecting the feed material from the orifice as single micro spheres having substantially the same particle size,
- subjecting the micro spheres ejected from the orifice to a stream of a carrier gas encircling the orifice, carrying the micro spheres onwards into a drying chamber, and
- subjecting the micro spheres to a drying gas causing evaporation of the volatile liquid and drying of the micro spheres into solid particles in the drying gas in the drying chamber.

The micro spheres that are generated one by one from the string of feed material from the orifice more or less like "pearls on a string" are caught by the carrier gas, having a relatively low velocity, to avoid breaking up or merger of the formed micro spheres. In case of multiple orifices, each individual orifice is encircled by carrier gas. The carrier gas gently transport the micro spheres into the drying gas in the drying chamber, where the micro spheres are dried into solid particles.

The carrier gas may have a temperature, which is equal to the temperature of the drying gas, but preferably the temperature of the carrier gas is lower than the temperature of the drying gas.

Consequently, in a preferred embodiment the temperature of the carrier gas in the area in front of the orifice is lower than the temperature of the drying gas in the drying chamber.

The relatively cold stream of carrier gas serves to fetch the micro particles ejected from the orifice and carry them onwards into the warmer drying gas wherein the micro particles are gently heated to a temperature allowing gradually more intense evaporation of the volatile liquid as the carrier gas is intermixed with the drying gas. Simultaneously with the heating caused by the increasing amount of heating gas in the mixture of carrier gas, particles and heating gas, the particles are distributed over the drying chamber so that a large quantity of drying gas is available to every particle. This distribution is important for the possibilities of effecting a gentle drying of the particles in the chamber, and in addition the risk of agglomeration of particles is reduced to a minimum. The latter effect ensures that the resulting dried particles have the so-called monodisperse size distribution, that is particles having very even particle size. The combined effects of the invention result in particles of a very dense structure.

The feed material enters the drying chamber as micro spheres via the orifice, which breaks the stream of liquid feed material into substantially uniform micro spheres. The orifice may be part of a nozzle. In the drying chamber the micro spheres are almost instantly brought into contact with the carrier gas, having a relatively low temperature in relation to the temperature present in the actual drying chamber. Depending on the characteristics of the volatile liquid some initial drying or removal of volatile liquid from the micro spheres can possibly take place in the upper portion of the drying chamber. Subsequently the micro spheres are brought into contact with the drying gas having higher temperature than the carrier gas. The drying gas gradually removes substantially all of the remaining volatile liquid from the micro spheres and transforms them into solid micro particles before they drop out of the drying liquid in the end of the drying chamber. Preferably less than 9%, more preferred less than 6% by weight of residual volatiles are left in the formed micro particles.

The volatile liquid may be any liquid suitable for serving as volatile liquid for the heat-sensible material, e.g. water, alcohol, ether, acetone etc.

The temperature of the drying gas should be selected to be well below the temperature where the heat-sensible material starts to decompose or transform to secure that the heat-sensible material keeps its desired properties in the micro particles. Preferably, the temperature of the drying gas is at least 5-10° C. below the temperature where the heat-sensible material starts to decompose or transform, more preferred at least 10-20° C. below this temperature.

The amount of the carrier gas led to the drying chamber is typically much lower than the amount of the drying gas led to the drying chamber. Preferably the amount of carrier gas constitutes 1-10% by weight in relation to the drying gas. The carrier gas may for some purposes be a saturated gas. A saturated gas has no ability of drying, but can to the contrary cool the micro spheres.

The method according to the invention produces micro particles of heat sensible material having excellent properties. The desired activity and properties of the heat sensible material can be maintained over extended time when the heat sensible material is processed by the method according to the invention. The micro particles according to the invention have mean particle sizes within a narrow range and are very dense. The pore volume constitutes only a minor part of the total volume of the micro particles. These properties are very advantageous, in particular when the heat sensible material is a pharmaceutical intended for use in needleless syringes.

The apparatus according to the invention is easy to operate and clean. The apparatus can be cleaned to obtain sterile conditions and it is in particular possible to apply CIP procedures (Cleaning In Place) for easy operation of the apparatus.

Moreover, the construction of the apparatus according to the invention has the unexpected advantageously effect that the drying volume of the apparatus can be surprisingly small. This reduces the cost for manufacture, and space required.

After drying by the method of the invention in the drying chamber, the micro particles may optionally be subjected to a separation step e.g. in a cyclone. However, such particle/gas separation processes are well-known to the skilled person and need not to be described in further details.

Although the temperatures of the carrier gas and the drying gas can be selected rather freely as long they meet the criteria for drying gas as stated above, it is preferred that the inlet temperature of the carrier gas is in a range below 40° C., more preferred in a range below 25° C. The inlet temperature of the carrier gas should not be lower than the freezing point of the volatile liquid used. Preferably the inlet temperature of the drying gas is in the range from 25 to 250° C., more preferred in the range from 30 to 120° C., and even more preferred in the range from 40 to 80° C. These preferred temperature intervals fulfill the requirements of a large range of heat-sensible materials used within the pharmaceutical industry, and are also well suited for other heat sensible materials.

In a preferred embodiment of the method according to the invention the micro spheres and the carrier gas is introduced into an area in the upper part of the drying chamber, and the drying gas is introduced into the drying chamber in an area below the area where the carrier gas is introduced. In this manner a very gentle, but yet efficient, removal of volatile liquid from the micro spheres is obtained, and the micro spheres are allowed to flow some distance into the drying chamber before being surrounded by drying gas, because the inflowing drying gas does not disturb the flow of carrier gas in vicinity of the orifice. This allows the carrier gas to get a safe hold of the micro spheres when they are ejected from the orifice, so that the micro spheres are carried well into the drying chamber before heating takes place. In order to avoid the carrier gas to cause too much turbulence in the dryer and to secure that the primary generation of droplets is not disturbed, it is preferred that the velocity of the carrier gas is less than 50 m/s, and more preferred less than 10 m/s.

Although the carrier gas may serve to remove some part of the volatile liquid from the micro spheres the carrier gas primarily serves simply to disperse the micro spheres into the drying gas in order to improve the above mentioned gentle drying and keeping the feeding orifice cool.

The carrier gas may simply flow with a downward flow carrying the micro spheres into the drying chamber. However in one embodiment it is preferred that the carrier gas flows about the orifice in a swirling motion, which improves the separation of the carrier gas from the drying gas in the upper portion of the drying chamber so that the micro spheres are carried deeper into the drying chamber before being heated by the drying gas. The micro spheres are consequently more finely dispersed in the chamber, and the drying becomes more even among all micro spheres, and the resulting product obtains better and more well defined product properties.

In this embodiment for the purpose of obtaining a highly efficient dispersion of the micro spheres into the drying gas, the carrier gas can in its swirling motion flow with a swirl number >0.5, preferably with a swirl number >1 and more preferred with a swirl number >2. The swirl number specifies the level of swirl in a spiral or vortex motion. The swirl number S is defined in terms of the ratio of the angular momentum flux, $M_{ang}$, to the axial momentum flux, $M_{ax}$, at a given cross section, so that for incompressible flow $S=M_{ang}/aM_{ax}$, where a is the outer radius of the vortex flow (for further details, see: Internal fluid flow; The fluid dynamics of flow in pipes and ducts; A. J. Ward-Smith; Clarendon Press, Oxford 1980, in particular chapter K "Flows with swirl").

The flow of drying gas in prior art drying chambers is typically turbulent. However, in the method according to the invention it is preferred that the flow of the drying gas includes a substantially laminar flow coaxially in the drying chamber. The laminar flow has low velocity, typically <0,5 m/s, preferably <0,3 m/s. A substantially laminar flow along the side walls of the drying chamber serves to prevent sticking of heat-sensible material to the side wall, because the laminar flow is separated from the tubular flow and difficult to enter for particles because of its stability as a boundry layer near the side wall. The laminar flow at the side wall increases the yield of heat-sensible material from the drying chamber.

In principle the micro spheres can be generated in any known manner, but preferably the method includes an oscillating device that acts on the feed and/or on the feed device having the orifice located at its delivery end. The delivery end is placed in the drying chamber, preferably in the upper and/or top part of the drying chamber above the drying gas inlet.

The oscillating device can be a mechanical, sonic or magnetic oscillating device, and preferably the oscillating device includes one or more piezo electric crystals. Piezo electric crystals are capable of oscillating with a very precise frequency, thus enhancing the uniformity of in the size of the micro spheres. Piezo electric crystal can moreover oscillate with very high frequencies, which is very advantageously for the purpose of forming small micro spheres.

Although the carrier gas may flow into the drying chamber in a downward more or less linear motion or with other flow patterns, in a preferred embodiment of the method according to the invention the carrier gas flow into the drying chamber in a swirling motion encircling the delivery end of the feed device. Thereby the carrier gas catches the formed micro spheres in the flow that penetrates well into the drying chamber. The swirling flow is in itself less turbulent and more even which acts to prevent that the micro spheres collide and merge. A merging of the micro spheres is highly undesired as it will lead to particles with different sizes and consequently the uniformity of the particles cannot be well controlled. Furthermore, according to the method of the invention the flow of carrier gas is adapted so it has no atomising effect on the micro spheres. An atomising effect will also lead to a situation where the uniformity of the formed particles cannot be controlled.

Although all gasses that are inert to the heat-sensible material are suitable for use in the method according to the invention it is preferred that the carrier gas and the drying gas are selected from atmospheric air, nitrogen, argon, helium, carbondioxide, and mixtures thereof and optionally sterilised. The carrier gas and the drying gas may be the same or different. Air is suitable as drying gas for many non-water solvents due to the large amount of drying gas used in relation to the amount of non-water volatiles in the drying gas. Thus, the risk of explosions is eliminated.

According to the method the yield of heat sensible material is higher than 90%, preferably higher than 95%, of the theoretical yield. The theoretical yield is a yield where 100% of the heat-sensible material led to the drying chamber in solution or dispersion is present in the recovered micro particles, or in other words there is no loss of material in the process line equipment. Thus, the invention provides for very high yields and very little loss of the heat-sensible material. This is advantageously, in particular when the heat-sensible material is expensive or involves active substances that cannot be released to the environment.

In a second aspect the present invention relates to an apparatus producing dried micro particles with a high density. The particles are preferably of a heat sensible material. The apparatus comprises a drying chamber having at least one inlet for a drying gas, and at least one feed device with an orifice for ejecting micro spheres, and it is characterized in that the feed device has a feeding end for receiving feeding material and a delivery end with an orifice for ejecting micro spheres of feeding material, that the feed device is surrounded by an outer tube with an air gap between an outer surface of the feed device and an inner surface of the tube, that the tube has a longitudinal axis and at least one inlet for carrier gas to said air gap.

The outer tube and the air gap directs the carrier gas in a flow that not only provides a flow envelope of carrier gas around the feed device, but also make the carrier gas entrap the micro spheres and penetrate a distance into the drying chamber together with the particles substantially without any intermixing of drying air into the flow.

In a preferred embodiment of the apparatus the at least one inlet for carrier gas is arranged tangential to the longitudinal axis at a position between the feeding end and the delivery end of the feed device. Due to the tangential inlet of the carrier gas to the air gap the carrier gas will flow in a rotation motion onwards through the air gap and past the orifice into the drying chamber. The carrier gas is thus effecting a swirling movement that keeps the carrier gas separate from the drying gas until the area inside the drying chamber where the swirling movement looses its momentum and the flow of carrier gas with the micro spheres is dissolved in the drying gas with consequent intermixing of the gasses and gradual heating of the micro spheres due to the higher temperature of the drying gas. At the time when the micro spheres are heated due to intermixing of drying gas, the micro spheres are also distributed over the cross-sectional area of the drying chamber. The resulting dispersion of the micro spheres in the drying gas is so even that substantially all micro spheres are subjected to the same, gentle drying conditions. Due to the fact that the drying only sets in gradually, the micro spheres are dried to very dense particles.

The feed device preferably includes an oscillation device capable of generating mutual oscillation between the feeding material and the feeding end of the feed device. The oscillation assists in breaking up the liquid feed into uniformly sized micro spheres. Adjustment of the frequency of oscillation can, together with the pressure of the liquid fee, be utilized to adjust the size of the micro spheres. The oscillation device can act mechanically on the feed device to cause it to oscillate or can act on the feed material via a member located in contact with the liquid feed material, or the oscillation device can interact with the fluid to cause non-mechanical pressure variations in the liquid.

Preferably, the oscillation device includes oscillating means in the form of one or more piezo electric crystals, which can be joined to the outer surface of the elongate member. The piezo electric crystals have the advantage of being simple to control via an electric source.

In the most preferred embodiment the feed device in the tube is mounted in an upper end wall of the drying chamber with the longitudinal axis of the tube extending in parallel with a longitudinal axis of the drying chamber, preferably coaxially therewith. This entails several advantages. With this orientation of the feed device the flow of carrier gas is directed in the longitudinal direction of the drying chamber, because the annular air gap between the elongate member and the tube provides the carrier gas with a distinct flow direction, and the mounting of the feed device in the upper end wall of the drying chamber makes the micro spheres flow downwards assisted by the effect of gravity which promotes a uniform flow down through the drying chamber.

Although it is possible to locate the at least one inlet for drying gas above or equal to the level of the orifice at the delivery end of the elongate member it is, however, preferred that the at least one inlet for drying gas is located at a level below the orifice at the delivery end of the elongate member. The embodiment secures that a very gentle, but yet efficient, removal of volatile liquid from the micro spheres is obtained. The micro spheres can flow some distance into the drying chamber before they meet the drying gas, because the inflowing drying gas does not disturb the flow of carrier gas in vicinity of the orifice. This allows the carrier gas to get a safe hold of the micro spheres when they are ejected from the orifice, so that the micro spheres are carried well into the drying chamber before heating takes place.

In a preferred embodiment of the apparatus according to the invention the apparatus comprises a plurality of feed devices for generating micro spheres. Preferably the apparatus comprises 2 to 8 feed devices arranged in the upper end wall of the drying chamber. The plurality of feed devices increases the capacity of the dryer. In preferred embodiments of the apparatus according to the invention the volume of the drying chamber is less than $0.1 \text{ m}^3$, and preferably larger than $0.03 \text{ m}^3$, when the produced particles have an mean particle size in the range of 1-59 µm and the volume of the drying chamber is less than $0.3 \text{ m}^3$, and preferably larger than $0.1 \text{ m}^3$, when the produced particles have an mean particle size in the range of 60-120 µm. These relations between the volume of the drying chamber and the mean particle size of the produced particles have proven to give optimal conditions for drying the micro spheres into particles with uniform size that have higher density than traditional spray dried particles.

Preferably the at least one inlet for carrier gas is connected to a gas supply device providing an inflow of carrier gas to the air gap resulting in swirling motion of the carrier gas in the air gap with a swirl number >0,5. An inflow of carrier gas to the air gap resulting in a swirl number >0,5 for the carrier gas serves to facilitate the dispersion of the micro spheres into the drying gas and prevent the micro spheres in colliding. Preferably the swirl number is >1 to improve the effect, more preferably the swirl number is >2 to obtain an even better effect.

In the apparatus according to the invention it is preferred that the length of the drying chamber is at least 3.5 times longer than the diameter of the drying chamber. The length of the drying chamber substantially determines the residence time of the micro spheres in the drying chamber and as a consequence the level of drying. An optimal length for efficient drying has proven to be at least 3.5 times longer than the diameter of the drying chamber.

Preferably the inlet for drying gas is provided with a filter substantially sterilizing the drying gas, thereby achieving a substantially sterile environment in the drying chamber, which is highly advantageously when drying pharmaceuticals.

BRIEF DESCRIPTION OF THE DRAWINGS

Examples of the invention are in the following described in further details with reference to the very schematic drawings, on which:

FIG. 1 illustrates an embodiment of the apparatus according to the invention,

FIG. 2 depicts an enlarged longitudinal section through a nozzle device of the apparatus in FIG. 1, FIG. 3 depicts a horizontal section through the nozzle device of FIG. 2, along the line A-A, FIG. 6 shows micro particles produced according to the invention.

DETAILED DESCRIPTION OF THE INVENTION

Figure 5:
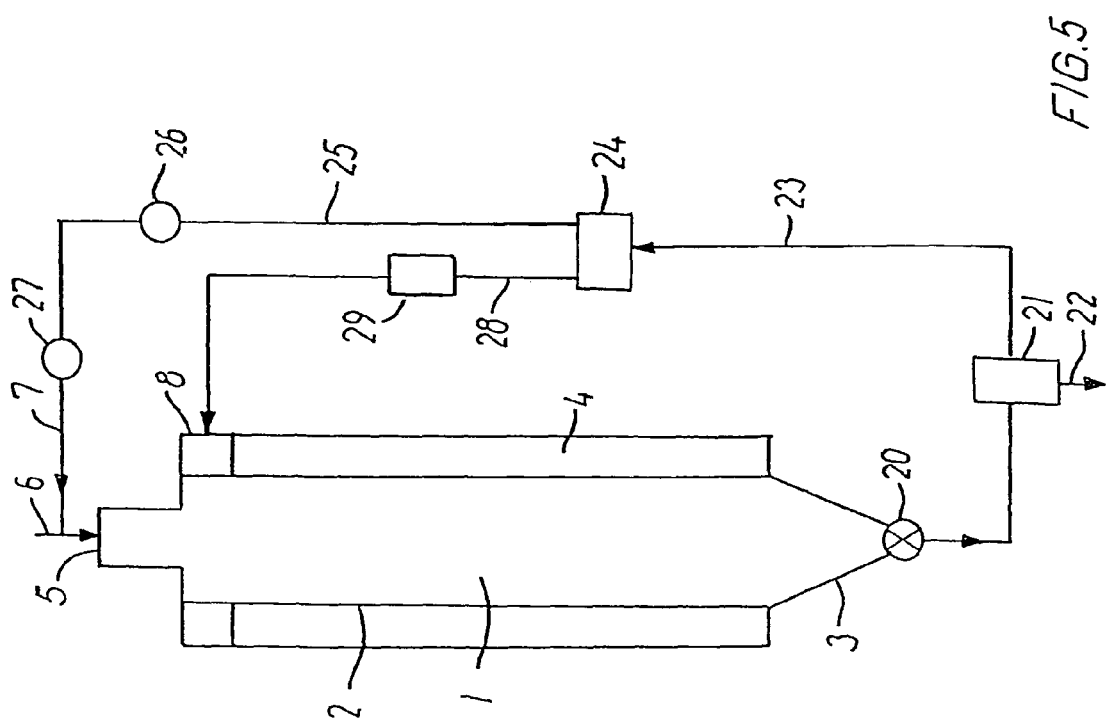
FIG. 5 shows an alternative embodiment of the apparatus according to the invention.

The term "micro spheres" refers to substantially spherically droplets optionally including heat-sensible material in a volatile liquid. The droplets have mean particle sizes within the range from about 1 to about 120 µm.

As used herein the term "micro particles" refers to small particles, which are substantially spherically and have mean particle sizes within the range from about 1 to about 120 µm.

The term "mean particle size" as used herein is defined as the volume of a sphere having the $D_{50}$ diameter. Thus, particles having the same volume as said sphere have the same mean particle size, although they may not be spherically.

The term "span" is defined as $(D_{90}-D_{10})/D_{50}$ in which $D_{10}$, $D_{50}$ and $D_{90}$ denotes the diameters of the 10% fractile, the 50% fractile and the 90% fractile, respectively.

The term "heat-sensible material" refers to a material, which includes at least one constituent that will decompose or transform when subjected to heat or a temperature above a certain level. The typical level for temperatures that are harmful to heat-sensible material is a temperature above 60-140° C. Common heat-sensible materials include biological materials and pharmaceutical material. In this context the term heat-sensible material also includes biological active material, which is only lesser heat-sensible.

As used herein "drying gas" means any gaseous medium capable of receiving and transporting evaporated volatile liquid.

The term "volatile liquid" as used herein, refers to any liquid medium suitable for dissolving the heat-sensible material or forming a stable dispersion or suspension with the heat-sensible material and being able of evaporating from said solution, dispersion or suspension.

FIG. 1 depicts an apparatus according to the invention. The apparatus comprises a drying chamber 1, having a cylindrical upper part 2 and a conical bottom part 3. The cylindrical upper part 2 is equipped with a heating mantle 4. The top of the drying chamber 1 is closed with an upper wall 5. The upper wall includes a device 6 for generating micro spheres and inlet 7 for a carrier gas. The upper part includes furthermore an inlet 8 for a drying gas. The inlet 8 is equipped with filters 9 to filtrate the drying gas and produce a diffuse flow of drying gas. The generated particles and used drying gas leaves through outlet 10 in the bottom part 3 of the drying chamber 1.

During operation, the heat-sensible material enters the drying chamber 1 included in micro spheres via an orifice in the device 6. The carrier gas enters the drying chamber via inlet 7, which encircle the orifice in the device 6 to facilitate immediate contact between the micro spheres and the carrier gas to initiate a dispersion of the micro spheres into the drying gas, which enters the drying chamber 1 via inlet 8. The filters 9 causes a diffuse flow of drying gas into the drying chamber 1, which will facilitate formation of substantially laminar flow of drying gas in the drying chamber 1. In principal the filters can be any filter device with any desired shape as long as they are able to facilitate the formation of a substantially laminar flow in the reactor. The micro spheres passes towards the bottom part 3 through the cylindrical part 2 of the drying chamber 1. During the passage the micro spheres give off substantially all volatile liquid to the drying gas. When they reach the outlet 10 in the conical bottom part 3 they have been transformed into micro particles.

FIG. 2 illustrates a preferred embodiment of a nozzle 11 according to the invention. The nozzle is suitable as device 6 for generating micro spheres and inlet for carrier gas as shown in FIG. 1. With reference to FIG. 2 the nozzle 11 comprises an inner tube 12 with a feeding end 13 and a delivery end 14. The delivery end 14 is tapered with an orifice 14a at the tapered end. The feeding end 13 receives feed 15 and the orifice 14a at the delivery end 14 delivers micro spheres 16. The inner tube 12 is in contact with piezo electric crystals connected to a source for electric voltage 18 via wires 18a. The inner tube 12 is encircled in an outer tube 19 thereby forming an annular gap 20 between the inner tube 12 and the outer tube 19. Moreover, the gap 20 is connected to an inlet 21 for carrier gas 22. The inner tube 12 and the outer tube 19 forms an annular outlet 23 for carrier gas encircling the delivery end 14.

As seen in FIG. 3, which depict the cross section in respect of the line A-A in FIG. 2 the inlet 21 is arranged tangentially into the gap 19 thereby promoting a swirling motion of the carrier gas from the annular outlet 23.

During operation the material to be formed into micro particles is feed to the feeding end 13 of the tube 12 as a solution, dispersion or suspension in a volatile liquid 15. In the tube 12 the feed 15 is subjected to oscillations from the piezo electric crystals 17 and when the feed 15 leaves the tube via orifice 14a in the delivery end 14 it instantly breaks into micro spheres 16 of substantially uniform size.

Simultaneously a flow of carrier gas is led to the annular outlet 23 via inlet 21 and gap 19. Due to tangentially arrangement of inlet 21 into gap 19 the carrier gas will obtain a flow with swirling movement, which will remain a while after the drying gas is released from annular outlet 23, and engage with the micros spheres. Thereby is obtained a dispersing effect on the micro spheres 16 in combination with a cooling flow of gas over the tube 12 and the delivery end 14.

Figure 4:
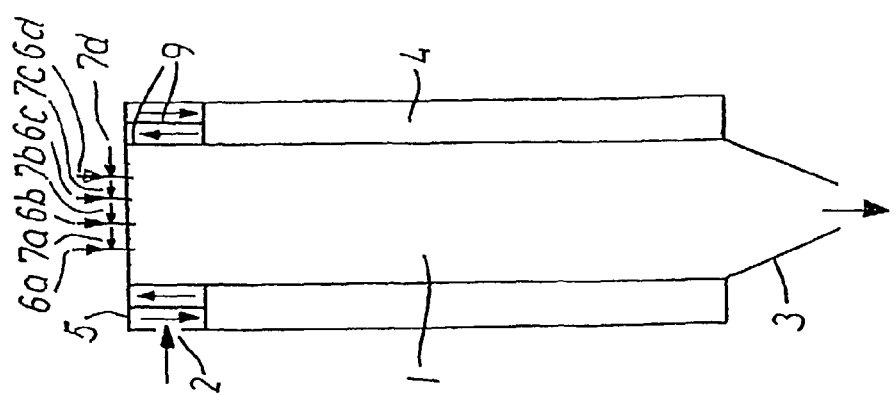
FIG. 4 illustrates an embodiment of the apparatus according to the invention with more nozzle devices in the upper plate.

FIG. 4 shows an embodiment of the apparatus according to the invention with more devices for generating micro spheres and inlets for carrier gas. Using the same reference numbers for the same parts as in FIG. 1 the apparatus includes a drying chamber 1 in a cylindrical part 2 and conical bottom part 3.

The cylindrical part is equipped with a heating mantel 4 for temperature control. The upper wall 5 comprises more devices 6*a*, 6*b*, 6*c*, 6*d* for generating micro spheres and inlets 7*a*, 7*b*, 7*c*, 7*d*. In principal the dryer may comprise numerous of devices for generating micro spheres arranged in an array. Moreover, the apparatus includes an inlet 8 for drying gasses including filters 9 for filtering the drying gas. The embodiment provides for an apparatus, which can produce micro particles with increased capacity.

FIG. 5 depict yet an alternative embodiment of the apparatus according to the invention. For the reason of clarity the same reference numbers for the same parts as in FIG. 1 are used. Thus, the apparatus includes a drying chamber 1 in a cylindrical part 2 and conical bottom part 3. The cylindrical part is equipped with a heating mantel 4 for temperature control. The upper wall 5 comprises a device 6 for generating micro spheres and an inlet 7 for carrier gas. Below the upper wall 5 is the inlet 8 for drying gas located. Additional the apparatus is equipped with an outlet device 20 for micro particles and spent carrier- and drying gas. The mixture of micro particles and spent carrier- and drying gas is lead to particle/gas separator 21, where the particles are taken of at 22. The gas is via pipe 23 led to regenerating device 24 to be recycled to the drying chamber 1. From the regenerating device 24 a first stream 25 is recycled to the drying chamber 1 as carrier gas by use of pump 27 and passing the cooler 26 to cool the carrier gas. A second stream 28 is recycled to the drying chamber 1 as drying gas after being heated in heater 29. This embodiment (closed cycle) is particular suitable, in particular when the heat-sensible material is expensive or involves active substances that cannot be released to the environment and/or the gas used is inert.

The cross section of drying chamber may have any desired shape, circular, oval, square etc., the preferred shape of the cross section is circular.

The method and apparatus according to the invention produces micro particles having a very uniform size, typically with a span <0,5. Moreover, the micro particles have a significant higher density (less porosity) than the micro particles manufactured in traditional spray dryers. Further, it is possible to produce larger particles compared to prior art spray drying equipment of similar dimensions.

EXAMPLE

The method according to the invention was tested on a sample of heat-sensible material using an apparatus according to the invention and in principle as described above.

The test sample consisted of trehalose, OVA (egg albinum) and β-galactosidase with the composition as described in table 1

TABLE 1

| Composition of test sample | |
|---|---|
| Compound | amount in % by weight |
| Trehalose | 90 |
| OVA (egg albinum) | 5 |
| β-galactosidase | 5 |

β-galactosidase is a heat-sensible enzyme and consequently suitable for testing the method and apparatus according to the invention.

The apparatus comprised a cylindrical drying chamber with the approx dimensions: height 100 cm, diameter 25 cm. The volume of the drying chamber was approx. 0,05 $m^3$. Moreover the apparatus were equipped with a nozzle according to the invention with and inner tube with approx diameter 5 mm, tapered in the delivery end to have an substantially circular outlet orifice with a diameter of approx 25 μm. The inner tube had a piezo electric plate placed on the outer surface. The piezo electric plate was operated with a frequency of 40000 Hz. The outer tube had a diameter of approx 8 mm.

During the test the sample was feed to the drying chamber via the orifice as 24% weight solution in water under the conditions shown in table 2. The amount of solid material used in the test was 30 g.

TABLE 2

| Operation conditions | |
|---|---|
| Inlet temperature | 72° C. |
| Outlet temperature | 70° C. |
| Carrier gas rate | 1 kg/h |
| Carrier gas temperature | 20° C. |
| Drying gas rate | 25 kg/h |
| Residence time | 7 sec |
| Particle diameter | 42 micron |
| Feed rate | 28 g/h |
| Feed pressure | 1.1 bar |
| Orifice diameter | 25 micron |
| Frequency of piezo plate | 40000 Hz |

Substantially uniform micro particles were produced. The micro particles obtained were substantially spherically with a diameter of approx 42 μm. Test material was present in the particles in a recovered amount of >98% of the material in the feed (i.e. yield >98%). The produced particles had a residual moisture of 4,9%, and the enzymatic activity of the heat-sensible material was fully maintained. Carrier gas and drying gas was filtered atmospheric air.

A reflective light photography of the produced particles are shown in FIG. 6, from which it can be seen that the particles are substantially uniform and spherically.

The invention claimed is:

1. A method for producing substantially monodisperse micro particles, mainly of a heat sensible material, said method comprising at least the steps of:

feeding a feed material comprising a volatile liquid to at least one orifice, said feed material being selected from the group consisting of a solution, a dispersion or a suspension, ejecting the feed material from the orifice as single micro spheres having diameters of substantially the same size, wherein the micro spheres ejected from the orifice is subjected to a stream of a carrier gas encircling the orifice, carrying the micro spheres onwards into a drying chamber, where the micro spheres is further subjected to a drying gas causing evaporation of the volatile liquid and drying of the micro spheres into solid particles in the drying gas in the drying chamber.

2. The method of claim 1, wherein the temperature of the carrier gas in the area in front of the orifice is lower than the temperature of the drying gas in the drying chamber.

3. The method of claim 1, wherein the inlet temperature of the carrier gas is in a range below 40° C.

4. The method of claim 1, wherein the inlet temperature of the drying gas is in the range from 25 to 250° C.

5. The method of claim 1, wherein the inlet temperature of the drying gas is in the range from 30 to 120° C.

6. The method of claim 1, wherein the inlet temperature of the drying gas is in the range from 40 to 80° C.

7. The method of claim 1, wherein the drying gas is introduced into the drying chamber at an area below the area where the carrier gas is introduced.

8. The method of claim 1, wherein the velocity of the carrier gas is less than 50 m/s.

9. The method of claim 1, wherein the velocity of the carrier gas is less than 10 m/s.

10. The method of claim 1, wherein the carrier gas disperses the generated micro spheres into the drying gas.

11. The method of claim 1, wherein the carrier gas encircles the orifice in a swirling motion.

12. The method of claim 11, wherein said swirling motion has a swirl number>0,5.

13. The method of claim 11, wherein said swirling motion has a swirl number>1.

14. The method of claim 11, wherein said swirling motion has a swirl number>2.

15. The method of claim 1, wherein the flow of said drying gas includes a substantially laminar flow in the drying chamber.

16. The method of claim 10 wherein the velocity of the substantially laminar flow is<0,5 m/s.

17. The method of claim 10 wherein the velocity of the substantially laminar flow is<0,3 m/s.

18. The method of claim 1, wherein an oscillating device acts on the feed.

19. The method of claim 18, wherein the oscillating device includes one or more piezo electric crystals.

20. The method of claim 1, wherein an oscillating device acts on a feed device having said orifice located at a delivery end.

21. The method of claim 20, wherein the oscillating device includes one or more piezo electric crystals.

22. The method of claim 1, wherein an oscillating device acts on the feed and on a feed device having said orifice located at a delivery end.

23. The method of claim 22, wherein the oscillating device includes one or more piezo electric crystals.

24. The method of claim 1, wherein the carrier gas and the drying gas are selected from the group consisting of atmospheric air, nitrogen, argon, helium, carbon dioxide, and mixtures thereof.

25. The method of claim 1, wherein the carrier gas and the drying gas are selected from the group consisting of sterilized atmospheric air, sterilized nitrogen, sterilized argon, sterilized helium, sterilized carbon dioxide, and mixtures thereof.

26. The method of claim 1, wherein the carrier gas is a saturated gas.

27. The method of claim 1, wherein the yield of said heat sensible material is higher than 90% of the theoretical yield.

28. The method of claim 1, wherein the yield of said heat sensible material is higher than 95% of the theoretical yield.

29. The method of claim 1, wherein the particles have a particle size distribution with a span<0,5.

30. An apparatus producing substantially monodisperse micro particles, mainly of a heat sensible material, and comprising a drying chamber having at least one inlet for a drying gas, and at least one feed device with an orifice for ejecting micro spheres one by one, wherein the feed device has a feeding end for receiving feeding material and a delivery end with an orifice for ejecting micro spheres of feeding material, that the feed device is surrounded by an outer tube with an air gap between an outer surface of the feed device and an inner surface of the tube, and at least one inlet for carrier gas to said air gap.

31. The apparatus of claim 30, wherein the feed device includes a oscillation device capable of generating mutual oscillation between the feeding material and the feeding end of the feed device.

32. The apparatus of claim 30, wherein the oscillation device includes oscillating means in the form of one or more piezo electric crystals.

33. The apparatus of claim 30, wherein the feed device in the tube is mounted in an upper end wall of the drying chamber with a longitudinal axis of the tube extending in parallel with a longitudinal axis of the drying chamber.

34. The apparatus of claim 30, wherein the feed device in the tube is mounted in an upper end wall of the drying chamber with a longitudinal axis of the tube extending in parallel with a longitudinal axis of the drying chamber, and coaxially therewith.

35. The apparatus of claim 30, wherein the at least one inlet for drying gas is located at a level below the orifice at the delivery end.

36. The apparatus of claim 30, wherein the apparatus comprises a plurality of feed devices for generating micro spheres, arranged in the upper end wall of the drying chamber.

37. The apparatus of claim 30, wherein the apparatus comprises 2 to 8 feed devices for generating micro spheres, said feed devices being arranged in the upper end wall of the drying chamber.

38. The apparatus of claim 30, wherein the diameter of the drying chamber is increased at a level below the inlet for drying gas.

39. The apparatus of claim 30, wherein the volume of the drying chamber is less than 0.10 m$^3$, and larger than 0.03 m$^3$, when the produced particles have a mean particle size in the range of 1-59 μm.

40. The apparatus of claim 30, wherein the volume of the drying chamber is less than 0.30 m$^3$, and larger than 0.1 m$^3$, when the produced particles have a mean particle size in the range of 60-120 μm.

41. The apparatus of claim 30, wherein the at least one inlet for carrier gas is arranged to supply carrier gas with a velocity of less than 50 m/s.

42. The apparatus of claim 30, wherein the at least one inlet for carrier gas is arranged to supply carrier gas with a velocity of less than 10 m/s.

43. The apparatus of claim 30, wherein the at least one inlet for carrier gas is arranged tangential to the longitudinal axis at a position between the feeding end and the delivery end of the feed device.

44. The apparatus of claim 30, wherein the at least one inlet for carrier gas is connected to a gas supply device providing an inflow of carrier gas to the air gap resulting in swirling motion of the carrier gas in the air gap with a swirl number>0,5.

45. The apparatus of claim 30, wherein the at least one inlet for carrier gas is connected to a gas supply device providing an inflow of carrier gas to the air gap resulting in swirling motion of the carrier gas in the air gap with a swirl number>1.

46. The apparatus of claim 30, wherein the at least one inlet for carrier gas is connected to a gas supply device providing an inflow of carrier gas to the air gap resulting in swirling motion of the carrier gas in the air gap with a swirl number>2.

47. The apparatus of claim 30, wherein the length of the drying chamber is at least 3.5 times longer than the diameter of the drying chamber.

48. The apparatus of claim 30, wherein the inlet for drying gas is provided with a filter substantially sterilizing the drying gas.

49. The method of claim 1, wherein the inlet temperature of the carrier gas is in a range below 25° C.

* * * * *